United States Patent
Den Boer et al.

(10) Patent No.: US 10,139,269 B2
(45) Date of Patent: Nov. 27, 2018

(54) DETECTING BROADSIDE ACOUSTIC SIGNALS WITH A FIBER OPTICAL DISTRIBUTED ACOUSTIC SENSING (DAS) ASSEMBLY

(71) Applicant: SHELL OIL COMPANY, Houston, TX (US)

(72) Inventors: Johannis Josephus Den Boer, Rijswijk (NL); Albena Alexandrova Mateeva, Houston, TX (US); Jeremiah Glen Pearce, Houston, TX (US); Jeffery Joseph Mestayer, Kingwood, TX (US); William Birch, Aberdeen (GB); Jorge Louis Lopez, Bellaire, TX (US); Johan Cornelis Hornman, Rijswijk (NL); Boris Nikolaevich Kuvshinov, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/677,640

(22) Filed: Aug. 15, 2017

(65) Prior Publication Data
US 2017/0370767 A1    Dec. 28, 2017

Related U.S. Application Data

(62) Division of application No. 15/259,348, filed on Sep. 8, 2016, now Pat. No. 9,766,119, which is a division
(Continued)

(51) Int. Cl.
*G01H 9/00* (2006.01)
*G01V 1/40* (2006.01)
*G01V 1/22* (2006.01)

(52) U.S. Cl.
CPC ............. *G01H 9/006* (2013.01); *G01H 9/004* (2013.01); *G01V 1/226* (2013.01); *G01V 1/40* (2013.01)

(58) Field of Classification Search
CPC ........ G01H 9/002; G01H 9/004; G01H 9/006; G01V 1/226; G01V 1/40
See application file for complete search history.

(56) References Cited

U.S. PATENT DOCUMENTS

| 4,141,623 A | 2/1979 | Dubost et al. |
| 4,524,436 A | 6/1985 | Hall et al. |
| (Continued) | | |

FOREIGN PATENT DOCUMENTS

| EP | 1299698 A2 | 4/2003 |
| GB | 2364380 A | 1/2002 |
| (Continued) | | |

OTHER PUBLICATIONS

International Search Report and Written Opinion received for PCT Patent Application No. PCT/US2012/069464, dated Mar. 28, 2013, 8 pages.
(Continued)

*Primary Examiner* — Daniel Petkovsek (57) ABSTRACT

A distributed fiber optic acoustic sensing system includes a cable having a cable length. The cable has an elongated body having an outer surface, and at least one straight optical fiber extending parallel to a longitudinal axis of the cable along the cable length; and one or more non-straight optical fibers, such as two orthogonal sinusoidal optical fibers extending along the cable length, or a helically wrapped optical fiber extending along the cable length. The sensing system further has light transmitting and receiving means optically connected to the optical fibers.

17 Claims, 5 Drawing Sheets

Related U.S. Application Data of application No. 14/365,231, filed as application No. PCT/US2012/069464 on Dec. 13, 2012, now Pat. No. 9,494,461.

(60) Provisional application No. 61/576,192, filed on Dec. 15, 2011.

(56) References Cited

U.S. PATENT DOCUMENTS

| | | | |
|---|---|---|---|
| 4,568,408 A | 2/1986 | Schmadel et al. | |
| 4,634,852 A | 1/1987 | Shaw | |
| 5,504,720 A | 4/1996 | Meyer et al. | |
| 5,696,628 A * | 12/1997 | Sutton | G02B 5/1847 359/3 |
| 6,004,639 A * | 12/1999 | Quigley | B29C 70/086 138/125 |
| 6,211,964 B1 | 4/2001 | Luscombe et al. | |
| 6,268,911 B1 | 7/2001 | Tubel et al. | |
| 6,269,198 B1 | 7/2001 | Hodgson et al. | |
| 6,281,489 B1 | 8/2001 | Tubel et al. | |
| 6,510,103 B1 | 1/2003 | Knudsen et al. | |
| 6,588,266 B2 | 7/2003 | Tubel et al. | |
| 6,601,671 B1 * | 8/2003 | Zhao | G01V 1/16 181/108 |
| 6,787,758 B2 | 9/2004 | Tubel et al. | |
| 6,840,114 B2 | 1/2005 | Niezgorski et al. | |
| 6,853,780 B1 * | 2/2005 | Brandi | G02B 6/443 385/103 |
| 6,874,361 B1 | 4/2005 | Meltz et al. | |
| 7,040,390 B2 | 5/2006 | Tubel et al. | |
| 7,201,221 B2 | 4/2007 | Tubel et al. | |
| 7,224,872 B2 | 5/2007 | Goldner et al. | |
| 7,245,791 B2 | 7/2007 | Rambow | |
| 7,284,903 B2 | 10/2007 | Hartog | |
| 7,315,666 B2 * | 1/2008 | Van Der Spek | E21B 47/01 385/12 |
| 7,369,716 B2 | 5/2008 | Berg et al. | |
| 7,668,411 B2 | 2/2010 | Davies et al. | |
| 7,740,064 B2 | 6/2010 | Mccoy et al. | |
| 7,946,341 B2 | 5/2011 | Hartog et al. | |
| 7,954,560 B2 | 6/2011 | Mathiszik et al. | |
| 8,131,121 B2 * | 3/2012 | Huffman | G01M 5/0025 356/73.1 |
| 8,380,021 B2 | 2/2013 | Rambow | |
| 8,505,625 B2 * | 8/2013 | Ravi | E21B 33/14 166/250.14 |
| 8,520,195 B2 | 8/2013 | Ramos et al. | |
| 8,848,485 B2 | 9/2014 | Bostick | |
| 8,924,158 B2 | 12/2014 | Kragh et al. | |
| 9,080,949 B2 | 7/2015 | Mestayer et al. | |
| 9,250,120 B2 | 2/2016 | Smith et al. | |
| 9,766,119 B2 * | 9/2017 | Den Boer | G01V 1/40 |
| 2004/0043501 A1 | 3/2004 | Means et al. | |
| 2005/0115741 A1 | 6/2005 | Terry et al. | |
| 2006/0233482 A1 | 10/2006 | Rambow | |
| 2009/0132183 A1 | 5/2009 | Hartog et al. | |
| 2009/0188665 A1 | 7/2009 | Tubel et al. | |
| 2009/0219171 A1 | 9/2009 | Vigneaux | |
| 2010/0107754 A1 | 5/2010 | Hartog et al. | |
| 2010/0207019 A1 | 8/2010 | Hartog et al. | |
| 2010/0254650 A1 | 10/2010 | Rambow | |
| 2010/0315630 A1 * | 12/2010 | Ramos | G01M 3/047 356/301 |
| 2011/0044574 A1 | 2/2011 | Strong | |
| 2011/0069302 A1 | 3/2011 | Hill et al. | |
| 2011/0088462 A1 | 4/2011 | Samson et al. | |
| 2011/0088910 A1 | 4/2011 | Mccan et al. | |
| 2011/0149688 A1 | 6/2011 | Hill et al. | |
| 2011/0185815 A1 | 8/2011 | Mccan | |
| 2011/0216996 A1 | 9/2011 | Rogers | |
| 2011/0280103 A1 | 11/2011 | Bostick | |
| 2011/0292763 A1 | 12/2011 | Coates et al. | |
| 2011/0320147 A1 | 12/2011 | Brady et al. | |
| 2012/0017687 A1 | 1/2012 | Davis et al. | |
| 2012/0018149 A1 | 1/2012 | Fidan et al. | |
| 2012/0020184 A1 | 1/2012 | Wilson et al. | |
| 2012/0057432 A1 | 3/2012 | Hill et al. | |
| 2012/0111104 A1 * | 5/2012 | Taverner | G01H 9/004 73/152.16 |
| 2012/0287749 A1 | 11/2012 | Kutlik et al. | |
| 2013/0242698 A1 | 9/2013 | Mcewen-King et al. | |

FOREIGN PATENT DOCUMENTS

| | | |
|---|---|---|
| WO | 2009158630 A1 | 12/2009 |
| WO | 2010010318 A2 | 1/2010 |
| WO | 2010034986 A1 | 4/2010 |
| WO | 2010136764 A2 | 12/2010 |
| WO | 2010136810 A2 | 12/2010 |
| WO | 2011010110 A2 | 1/2011 |
| WO | 2011039501 A2 | 4/2011 |
| WO | 2011058312 A2 | 5/2011 |
| WO | 2011058313 A2 | 5/2011 |
| WO | 2011058314 A1 | 5/2011 |
| WO | 2011058322 A2 | 5/2011 |
| WO | 2011067554 A1 | 6/2011 |
| WO | 2011076850 A1 | 6/2011 |
| WO | 2011079107 A2 | 6/2011 |
| WO | 2011141537 A1 | 11/2011 |
| WO | 2011148128 A1 | 12/2011 |

OTHER PUBLICATIONS

International Search Report and Written Opinion received for PCT Patent Application No. PCT/US2013/052647, dated Jan. 2, 2014, 6 pages.

Barrias et al., "A Review of Distributed Optical Fiber Sensors for Civil Engineering Applications", vol. 16, Issue No. 5, Sensors, May 23, 2016, 35 pages.

"Fiber Optic Sensor Technology", Luna Innovations, Products and Services, Jun. 2015, Web link-www.AutomotiveTestingTechnologyInternational.com, 2 pages.

* cited by examiner

DETECTING BROADSIDE ACOUSTIC SIGNALS WITH A FIBER OPTICAL DISTRIBUTED ACOUSTIC SENSING (DAS) ASSEMBLY

RELATED CASES

This application is a divisional application claiming benefit of U.S. application Ser. No. 15/259,348, filed on 8 Sep. 2016, now U.S. Pat. No. 9,766,119, which is a divisional application claiming benefit of U.S. application Ser. No. 14/365,231, filed on 13 Jun. 2014, now U.S. Pat. No. 9,494,461, which is a U.S. national stage application of International application No. PCT/US2012/069464, filed on 13 Dec. 2012, which claims priority from U.S. application Ser. No. 61/576,192, filed on 15 Dec. 2011, each of which are incorporated herein by reference in their entirety.

FIELD OF THE INVENTION

The invention relates to fiber optic devices and in particular to a fiber optical Distributed Acoustic Sensing (DAS) assembly that is adapted to sense the magnitude and direction of acoustic signals, and particularly those signals that are travelling at an angle or substantially perpendicular to the device.

BACKGROUND OF THE INVENTION

Various attempts have been made to provide sensing capabilities in the context of petroleum exploration, production, and monitoring, with varying degrees of success. Recently, these attempts have included the use of fiber optic cables to detect acoustic energy. Because the cables typically comprise optically conducting fiber containing a plurality of backscattering inhomogeneities along the length of the fiber, such systems allow the distributed measurement of optical path length changes along an optical fiber by measuring backscattered light from a laser pulse input into the fiber. Because they allow distributed sensing, such systems may be referred to as "distributed acoustic sensing" or "DAS" systems. One use of DAS systems is in seismic applications, in which seismic sources at known locations transmit acoustic signals into the formation, and/or passive seismic sources emit acoustic energy. The signals are received at seismic sensors after passing through and/or reflecting through the formation. The received signals can be processed to give information about the formation through which they passed. This technology can be used to record a variety of seismic information. Another application is in the field of in-well applications and acoustic fluid monitoring.

DAS systems typically detect backscattering of short (1-10 meter) laser pulses from impurities or inhomogeneities in the optical fiber. If fiber is deformed by an incident seismic wave then 1) the distance between impurities changes and 2) the speed of the laser pulses changes. Both of these effects influence the backscattering process. By observing changes in the backscattered signal it is possible to reconstruct the seismic wave amplitude. The first of the above effects appears only if the fiber is stretched or compressed axially. The second effect is present in case of axial as well as radial fiber deformations. The second effect is, however, several times weaker than the first. Moreover, radial deformations of the fiber are significantly damped by materials surrounding the fiber. As a result, a conventional DAS system with a straight fiber is mainly sensitive to seismic waves polarized along the cable axis, such as compression (P) waves propagating along the cable or shear (S) waves propagating perpendicular to the cable. The strength of the signal varies approximately as $\cos^2 \theta$, where $\theta$ is the angle between the fiber axis and the direction of wave propagation (for P waves). Thus, while there exists a variety of commercially available DAS systems that have varying sensitivity, dynamic range, spatial resolution, linearity, etc., all of these systems are primarily sensitive to axial strain. Acoustic signals travelling normal to the fiber axis may sometimes be referred to as "broadside" signals and, for P waves, result in radial strain on the fiber. Thus, as the angle between direction of travel of the acoustic signal and the fiber axis approaches 90°, DAS cables become much less sensitive to the signal and may even fail to detect it.

Hence, it is desirable to provide an improved cable that is more sensitive to signals travelling normal to its axis and enables distinguishing radial strain from the axial strain. Sensitivity to broadside waves is particularly important for seismic or microseismic applications, with cables on the surface or downhole. In addition to broadside sensitivity, it is also desirable to provide three-component (3C) sensing, from which the direction of travel of the sensed signal can be determined.

SUMMARY OF THE INVENTION

The present invention provides an improved fiber optic cable system for distributed acoustic sensing that is more sensitive to signals travelling normal to its axis and is thus better able to distinguish radial strain from axial strain on the system. Acoustic signals travelling normal to the cable axis may sometimes be referred to as "broadside" signals and result in radial strain on the fiber. The present invention also provides three-component (3C) sensing, from which the direction of travel of the sensed signal can be determined.

According to some embodiments, a distributed fiber optic acoustic sensing system comprises an elongated body having an outer surface, an optical fiber disposed on the outer surface at a first predetermined wrap angle, and light transmitting and receiving means optically connected to the fiber for, respectively, transmitting an optical signal into the fiber and receiving a backscattered component of the signal out of the fiber. The system may further include a second optical fiber disposed on the outer surface at a second predetermined wrap angle. The wrap angles may be measured with respect to a plane normal to the axis of the body and the first wrap angle may be 90° and the second wrap angle may be less than 45°.

The system may further include a third fiber disposed on the outer surface at a wrap angle between 90° and 45°. At least one of the fibers may include Bragg gratings.

The body may have a circular cross-section or an elliptical cross-section and may include a layer of swellable elastomer surrounding the body.

A sensing rod may be disposed in the elongated body and may contain at least one additional fiber. The additional fiber(s) may be substantially straight, helical, or sinusoidal.

The system may further include layer of swellable elastomer between the sensing rod and the elongate body. Additionally or alternatively, the system may include a first sheath layer on the outside of the body and covering the fiber. The first sheath layer may have an oval external cross-section. The elongate body may have a non-circular cross-section having a larger semi-axis and the first sheath layer may be configured so that its larger semi-axis is perpendicular to the larger semi-axis of the elongate body.

The system may include a second optical fiber wrapped around the outside of the first sheath layer. The first fiber and the second fiber may define different wrap angles. The system may include a second sheath layer on the outside of the first sheath layer and covering the second fiber. At least one of the sheath layers preferably comprises a polyamide or material having a similar elastic impedance.

Other embodiments of a distributed fiber optic acoustic sensing system comprise an elongate body having an outer surface that includes at least one substantially flat face, a first optical fiber housed in the body, and light transmitting and receiving means optically connected to the fiber for transmitting an optical signal into the fiber and receiving a backscattered component of the signal out of the fiber. The body may have a polygonal or triangular cross-section. The first fiber may be sinusoidal and the system may include a second sinusoidal fiber defining a plane perpendicular to the plane of the first fiber. The system may include a third fiber, which may be substantially straight or helical, and may define a wrap angle with respect to a plane normal to the axis of the body. The wrap angle may be less than 45° or less than 30°.

In preferred embodiments, the substantially flat face may have a visual appearance that is different from the appearance of the rest of the outer surface.

Still other embodiments of the invention include a distributed fiber optic acoustic sensing system comprising an inner tube, a layer of swellable elastomer surrounding the tube, a tube of swellable elastomer surrounding the elastomer layer and defining an annulus therewith, and at least one sensor pad or strip disposed in the elastomer tube, each sensor pad comprising a stiffener and at least one longitudinal fiber affixed thereto or embedded therein. The system may include at least four sensor pads are disposed in the elastomer tube. At least one optical fiber may be housed in the inner tube.

The inner tube may comprise a steel tube and the elastomer layer and the elastomer tube may be configured such that when they swell the annulus disappears. The elastomer layer is further configured such that when it swells without being constrained, its diameter exceeds a predetermined value that is selected to correspond to the inner diameter of a hole in the earth. The elastomer tube may be further configured such that when it swells in a borehole, the sensor pad(s) is/are disposed at the outer surface of the elastomer tube. The longitudinal fiber in each sensor pad may be sinusoidal, and/or each sensor pad may include one sinusoidal longitudinal fiber and one straight longitudinal fiber. At least one of the optical fibers may contain Bragg gratings.

Still other embodiments of a distributed fiber optic acoustic sensing system for use on a surface comprise an inner tube housing at least one optical fiber, a body of protective material surrounding the tube, the body having an outer surface that includes at least one substantially flat face, and at least one sensor pad or strip disposed in the body, the sensor pad comprising a stiffener and at least one longitudinal fiber affixed thereto or embedded therein. The at least one sensor pad may also include at least one sinusoidal fiber affixed thereto or embedded therein. The system may include at least two sensor pads that each include at least one sinusoidal fiber affixed thereto or embedded therein, and the two sensor pads may be mutually perpendicular. At least one sensor pad may be adjacent to the flat face.

The inner tube may also house at least one electrical transmission line. The system may further including an anchor that is configured to overlie the body and includes at least one arm for anchoring the anchor and body to the surface. The arm may be straight or curved.

As used herein the phrases "propagating along the fiber" and "propagating perpendicular to the fiber," when used in reference to an acoustic signal, will be understood to refer to P waves that are polarized along their direction of propagation.

BRIEF DESCRIPTION OF THE DRAWINGS

For a more detailed understanding of the invention, reference is made to the accompanying drawings wherein.

DETAILED DESCRIPTION OF A PREFERRED EMBODIMENT

DAS Cable with Helically Wrapped Fibers for Improved Broadside Sensitivity

One aspect of the present invention comprises a DAS fiber helically wrapped around a cable or mandrel for the purpose of providing improved broadside sensitivity. A helically wound fiber will always include portions of the fiber that form relatively small angles with the incident wave, independently of the angle of incidence. Assuming that the cable and fiber are perfectly coupled to the formation, one can determine the fiber angular sensitivity S by projecting the wave strain along the fiber axis. This gives:

$$S = \cos^2\theta \sin^2\alpha + \frac{\sin^2\theta \cos^2\alpha}{2}$$

where α is the wrapping angle, i.e. the angle between the fiber and a plane perpendicular to the cable or mandrel axis, and θ is the angle of incidence with respect to the cable of mandrel axis.

Figure 1:
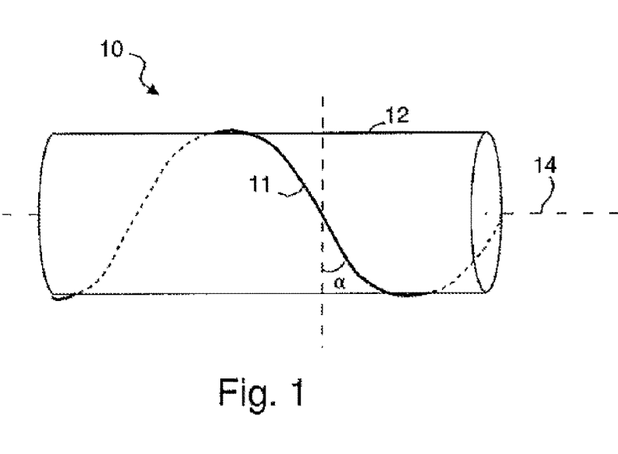
FIG. 1 is a schematic side view of a cable constructed in accordance with one embodiment of the invention.
Figure 2:
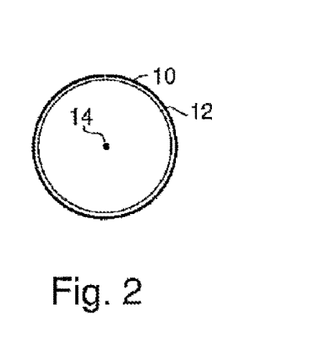
FIG. 2 is a schematic end view of the embodiment of FIG. 1.

FIGS. 1 and 2 are schematic side and end views, respectively, of an optical sensing system 10 comprising a fiber 11 wrapped helically with a wrap angle of a around a cable 12 having an axis 14. While not described in detail herein, it will be understood that the optical sensing systems disclosed below are used in conjunction with optical light transmitting and receiving means that are connected to the fiber for transmitting an optical signal into the fiber and receiving a backscattered component of the transmitted signal out of the fiber.

The case of a straight fiber corresponds to the wrapping angle α=90°. If the wrapping angle is about α=35°, then the fiber sensitivity will not depend on the angle θ and will be equal to S=⅓. As can be seen, a helically wrapped fiber does not change the overall sensitivity of the system, but redistributes it in three spatial directions.

The above sensitivity S refers to unit fiber length. The length of the fiber $L_f$ is equal to $L_f=L_c/\sin \alpha$, where $L_c$ is the length of the cable along which the fiber is wrapped. The sensitivity of a helically wrapped fiber per unit cable length is thus (1/sin α) times higher than the above value of S. Hence, by using a helically wrapped fiber, it is possible to not only increase the broadside sensitivity of the system, but also its overall sensitivity by packing more fiber length in the same cable length compared with a straight fiber. Alternatively, by using a wrapped fiber and decreasing the cable-length of the sensing channels, the spatial resolution can be increased while retaining the same sensitivity as with a straight fiber.

The concepts described herein can be implemented using one, two, or three fibers with different wrapping angles. Preferred embodiments of the sensing system include at least one fiber with a wrap angle of 90°, i.e. parallel to the cable axis, and one fiber with a wrap angle less than 45°. Still more preferred embodiments include a third fiber with a wrap angle between 45° and 90°. Fibers with different wrapping angles have different directional sensitivity, and by comparing their responses one can determine the direction of wave propagation with respect to the fiber axis.

In addition, multiple fibers can be wrapped inside a single cable at different radii. Alternatively, multiple cables each having a single helically wrapped fiber can be used. Still further, while certain embodiments are disclosed in terms of a fiber that is wrapped around a cylindrical body, it will be understood that the fiber need not actually encircle the body but may instead change or reverse direction so as to define fiber segments having a predetermined wrap angle alternating with bends or reversing segments.

Figure 3:
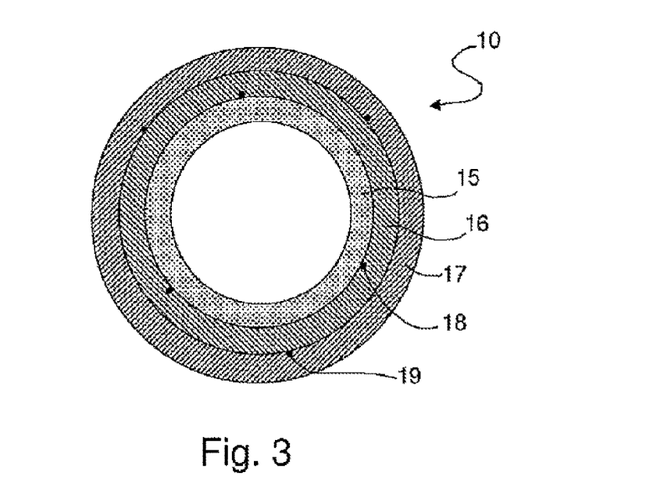
FIG. 3 is a schematic transverse cross-section of a cable constructed in accordance with another embodiment of the invention.

Thus, as shown in FIG. 3, a particular preferred embodiment comprises an inner liner 15, a first sheath layer 16, and a second sheath layer 17. Wrapped around liner 15 and covered by sheath layer 16 are a plurality (three, as illustrated) of optical fibers 18. Fibers 18 are preferably wrapped at a first wrap angle with respect to the plane normal to the cable axis. Similarly, a plurality (three, again, as illustrated) of optical fibers 19 are preferably wrapped around liner 16 and covered by sheath layer 17. Fibers 19 are preferably wrapped at a second wrap angle that is different from the first wrap angle of fibers 18. In one preferred embodiment, one of fibers 18 or 19 is straight, i.e. with a wrap angle of 90° and the other is wrapped with a small wrap angle, i.e. a wrap angle less than 45° with respect to the plane normal to the cable axis. The use of different wrap angles provides different directional sensitivities from which, by comparing their responses, it is possible to determine the direction of wave propagation with respect to the fiber axis. It will be understood that additional fibers having additional wrap angles can also be included.

By way of example only an optical sensing system may include a first, straight fiber, a second fiber with a wrap angle of 30° with respect to the plane normal to the cable axis, and a third fiber with a wrap angle of between 30° and 90°. The fiber wrapped at 30° gives exactly 2 m of fiber per 1 m of axial length and the third fiber allows for verification of data from other two fibers.

In embodiments such as that of FIG. 3, the sheath layers may be constructed of polyamide polymers, e.g. Nylon 12, or other suitable materials whose elastic impedance, do not differ significantly from impedance of the formation. Fibers 18 and 19 may be any suitable tight buffered optical fibers such as are known in the art. The inside of liner 15 may be empty or filled with fluids, such as ground water, formation water, gel, or other suitable fluids.

In case of a non-perfect coupling between the cable and formation, the fiber sensitivity has the form $$S=\cos^2 \theta \sin^2 \alpha + (A+B \sin^2 \theta)\cos^2 \alpha$$

where A and B are constants whose values depend on the material properties of the cable and formation.

The choice of the cable material depends on the concrete purpose of the DAS system. For example, a relatively stiff cable with a Young's modulus of several GPa provides a low material contrast with the formation, which corresponds to A=0 and B=0.5 in the above equation. Such a cable has better directional sensitivity than a more flexible cable. Using such cables may be preferable in a borehole environment or if the cable is buried deep in the subsurface. In case of soft cables, the value of A can be much larger than 1. The signal from such cables will have weak dependence on the wave propagation angle, but such cables will have a higher overall sensitivity. This is important for trenched cables that lie close to the surface, where the pressure of the incident wave is very low.

The quantities A and B depend on the cable construction and the acoustic properties of the surrounding medium (Vp, Vs, density). In the near-surface, these medium properties vary over time due to seasonable changes, rain, etc. These variations produce misleading time-lapse effects that tend to mask true time-lapse signals from reservoir processes. One way to overcome this problem is to measure the seismic signals along the cable as a function of incidence angle and determine the quantities A and B ab initio. Such an approach may not be practical in general, but may be feasible in time-lapse applications, i.e, only determining the changes in A and B, information which would be useful to increase the fidelity of time-lapse processing.

A fiber wrapped around a circular cylinder, however, does not discriminate between waves propagating normally to the cable axis from different azimuthal directions Azimuthal sensitivity can be added by using helixes of noncircular, e.g. elliptical, wrapping shapes, which allow detection of all three components of the incident waves.

DAS Cable with Built-in Cable Trajectory Visualization (RTCM) Capability

In some embodiments, the cable could include a distributed strain sensing (DSS) fiber similar to the one used in real-time compaction monitoring (RTCM) systems. In RTCM systems, an optical fiber is used that contains thousands of fiber Bragg gratings (FBGs) wrapped around a tubular. Because the fiber is helically wrapped, the strain response can be decomposed into different deformation modes (bending, ovalization, axial strain) and the outputs of the decomposition can be used to produce a three-dimensional image of the tubular shape.

The same principle can be applied to the cable disclosed in this present invention so as to measure the hole trajectory from the strain on the cable, which is important to know in some seismic applications. In this embodiment, an additional fiber containing FBGs can be embedded into the cable or one of the fibers used for DAS can contain FBGs with grating wavelengths that are sufficiently different from the interrogation wavelength of the DAS system. The RTCM interrogation unit would record the strain on the cable after/during installation to measure the shape of the cable and infer the trajectory (azimuth, depth, etc.) of the hole. From the trajectory of the hole, the location of the DAS channels can be derived in space relative to the seismic source(s) at the surface and to the formation.

In addition, this cable can be used as a permanent monitor of the geomechanics of the field. By monitoring the change in cable shape over time, it is possible to measure the amount of surface subsidence caused by oil and gas production. This information, when combined with the seismic data from DAS can improve the understanding of the reservoir dynamics and the geomechanics of a producing field.

Deployment Methodology to Allow Low-Noise Recording and Virtual Source Seismic

For surface seismic applications, the optical sensing cable incorporating the present concepts can be deployed in one or more trenches on the earth's surface or the seabed, or inside a small-diameter hole, or "data-hole," in consolidated formations in the subsurface or subsea. The latter deployment mode tends to provide higher-quality data with higher-frequency content and allows virtual source seismic monitoring. It also reduces the environmental footprint of the sensing system.

Suitable small-diameter holes can be drilled using low-cost drilling techniques, such as horizontal directional drilling (HDD) or water-jetting. HDD and water-jet drilling are often used for installing infrastructure such as telecommunications, power cables, gas mains etc. The horizontal or deviated hole may run several tens or hundreds of meters below the surface and may be hundreds or even thousands of meters long.

Once a data-hole has been drilled, there are various ways to install the optical sensing system. One way is to push a tube containing the optical sensing system into the hole, thereby using the drilling hose or tube, if it is still in the hole, as a guide to position the sensing tube inside the hole. After the sensing tube is in place, the drilling hose or tube may be removed from the hole.

In still other embodiments (not shown), the optical fiber (s) are integrated in the wall of the high pressure-hose or tubes used by the drilling system. In these embodiments, once the data-hole has been drilled, the pressure-hose/tubes incorporating the sensing system are left behind in the hole.

In other embodiments, the data-hole may include a surface exit. In this case, the sensing system can be pulled into the hole via the surface exit when the drill-string is being retrieved from the hole.

Figure 4:
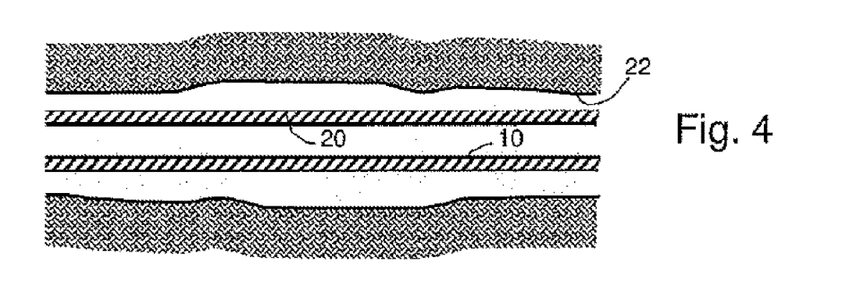
FIG. 4 is a schematic axial cross-section of an optical sensing system in accordance with the invention in a borehole.
Figure 5:
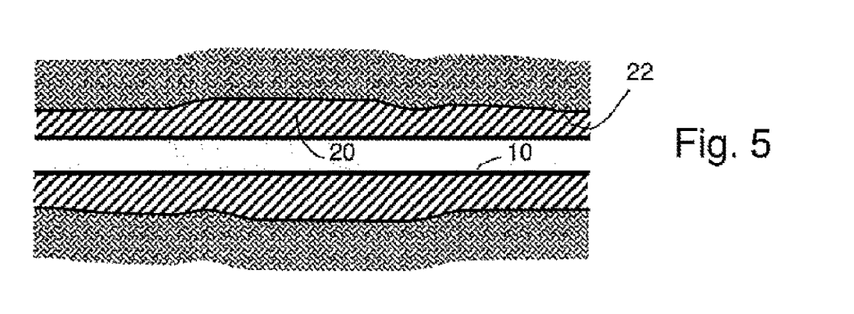
FIG. 5 is another view of the system of FIG. 4 after swelling of a swellable layer.

In some embodiments, the tubular containing the optical sensing system 10 may have an outer coating comprising a swellable elastomer 20, as shown in FIG. 4. As illustrated in FIG. 5, the elastomer swells when in contact with formation water or other pre-selected liquid, thereby fixing the sensing tube against the inner wall 22 of the borehole and ensuring good mechanical and acoustic coupling with the formation. Swellable elastomers are known in the art. Alternatively, the annulus between the sensing tube and the formation may be filled with fluid, a gel or cement.

Figure 6:
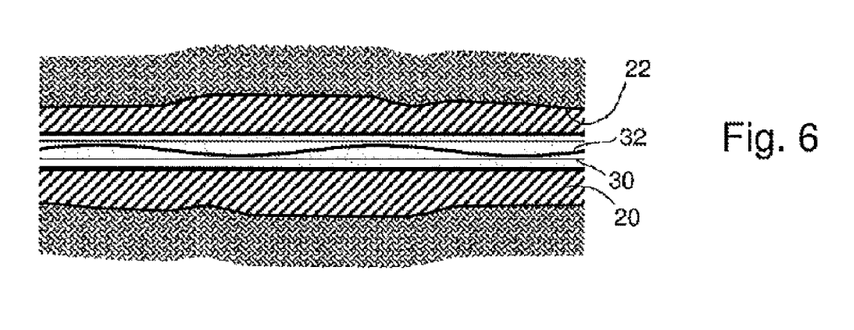
FIG. 6 is another view of the system of FIG. 5 showing placement of a sensing rod in the system.
Figure 7:
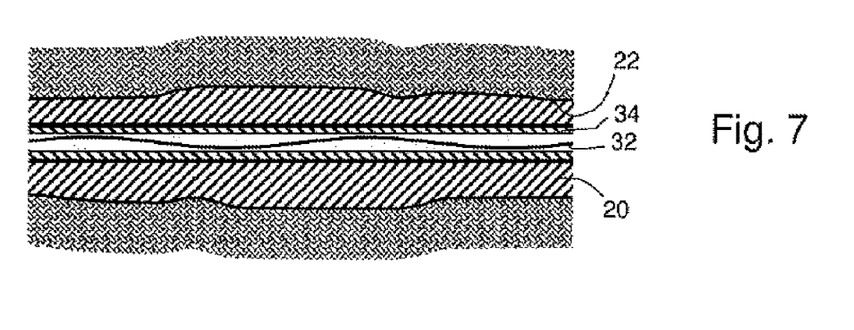
FIG. 7 is another view of the system of FIG. 6 after swelling of a second swellable layer.

Referring now to FIG. 6, after the sensing tube has been put in place, a separate sensing rod 30 may be installed inside the sensing tube 10. Sensing rod 30 may contain a plurality of straight, sinusoidal, and/or wrapped fibers 32. If wrapped (not shown), fibers 32 preferably have a large pitch, i.e. a small wrap angle, e.g. less than 45° and more preferably less than 30°. If desired, rod 30 may be centralized and fixed inside the sensing tube by means of a layer of swellable rubber, fluid, gel, cement, etc., as shown at 34 in FIG. 7.

Since a straight cable is sensitive only to one direction (along the cable), it allows a simple partitioning of the signal recorded on a wrapped fiber into along-the-cable and across-the-cable components, assuming that both fibers (wrapped and straight) are made of the same material and embedded in the same medium. If they are of different materials or in different parts of the cable (center vs. periphery), their overall sensitivities to external formation strain may be different—i.e., they may have different A and B coefficients in the equation above. In that case, a straight cable may still help calibrate or constrain the partitioning of the wrapped fiber signal but the calibration would not be through direct subtraction of the along-the-cable component.

Cable Configuration

Figure 8:
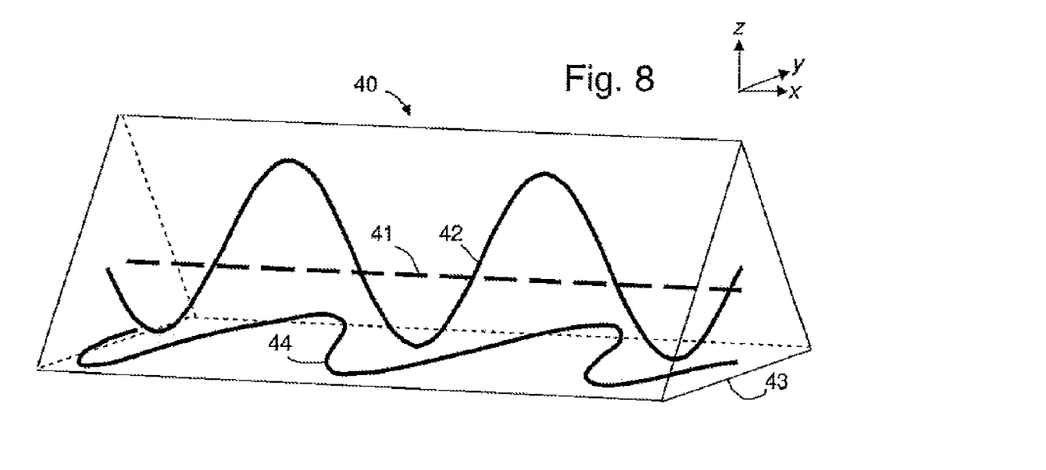
FIG. 8 is a schematic illustration of an optical sensing system in accordance with another embodiment.

In order to enable a decomposition of a signal into three orthogonal components, it is necessary to use at least three fibers that in combination provide sensitivity in all three directions. Referring now to FIG. 8, an alternative construction for an optical sensing system with 3 fibers comprises a cable 40 having a triangular cross-section and at least two orthogonal sinusoidal optical fibers 42, 44 and a straight fiber 41 therein.

An advantage of the triangular cross-section is that the cable has a flat bottom surface 43, which can be fixedly oriented with respect to, e.g., the inner or outer wall of a tubular, which in turn facilitates azimuthal sensing. It will be understood that while cable 40 is shown with a triangular cross-section, any polygon would be suitable. Further, if a flat bottom surface is not desired, the cable cross-section may be round, elliptical, oval, or any other shape. In order to facilitate installation of the cable with a known orientation, bottom surface 43, or all or a portion of one of the other surfaces may be color-coded or otherwise visually marked. In the absence of such external indicator, the determination of the azimuthal orientation of the cable must be made through first-arrival analysis.

Still referring to FIG. 8, fiber 42 will be sensitive to signals having components in the inline (x) and vertical (z) directions. Similarly, fiber 44 will be sensitive in the inline (x) and cross-line (y) directions. Fiber 41 has sensitivity in the inline (x) direction. The three fibers are assumed to be identically coupled to the formation. Accordingly, a combination of the responses of fibers 41, 42 and 44 enables a decomposition of the signal into the x, y, and z directions. In other embodiments (not shown), a sinusoidal fiber may be disposed along one, two, three, or more surfaces of a body having a polygonal cross-section. Thus, for example, three sinusoidal fibers may be disposed, each against one side of a body having a triangular cross-section. Signals from those three fibers could also be decomposed to three orthogonal sets. Such cable may be easier to manufacture.

Figures 9, 10:
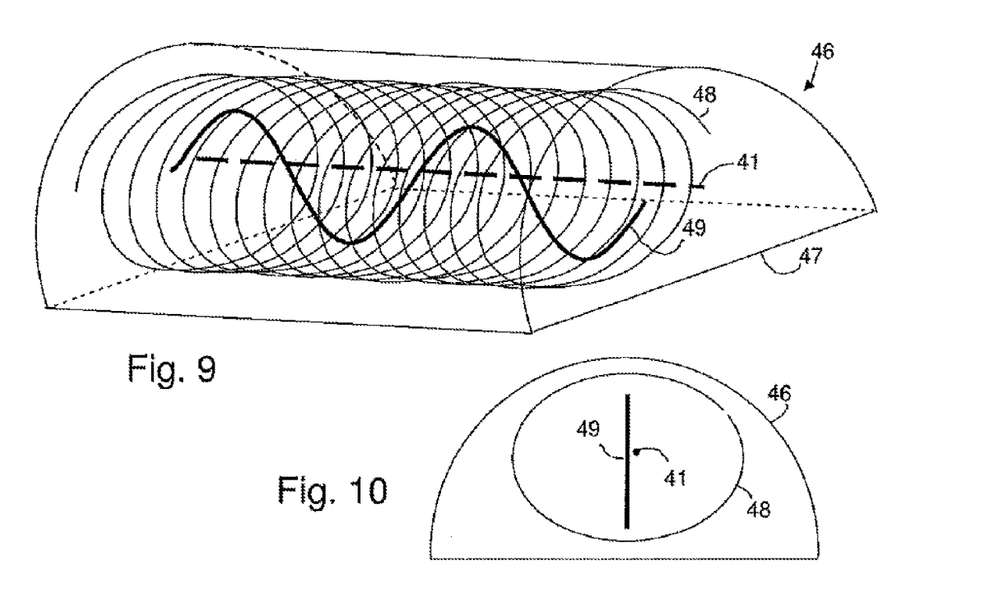
FIG. 9 is a schematic illustration of an optical sensing system in accordance with another embodiment.
FIG. 10 is a schematic end view of the system of FIG. 9.

In another variation, the embodiment shown in FIGS. 9 and 10 comprises a cable 46 having a hemi-circular cross-section and a flat bottom surface 47. In cable 46, one fiber 48 is helically wrapped with a small wrap angle and a second fiber 49 is sinusoidal. Fiber 48 will be sensitive in the inline (x), cross-line (y), and vertical (z) directions.

In either case, additional straight fibers 41 (shown in phantom in FIGS. 8 and 9) can be included in the cable, as discussed above. Straight fiber 41 will be sensitive to the inline direction (x). By using a combination of horizontal, vertical, and straight fibers, preferably recording in the same conditions, it is possible to generate 3C data.

Deployment of a Multi-Component Cable

Figures 11, 12, 13, 14, 15:
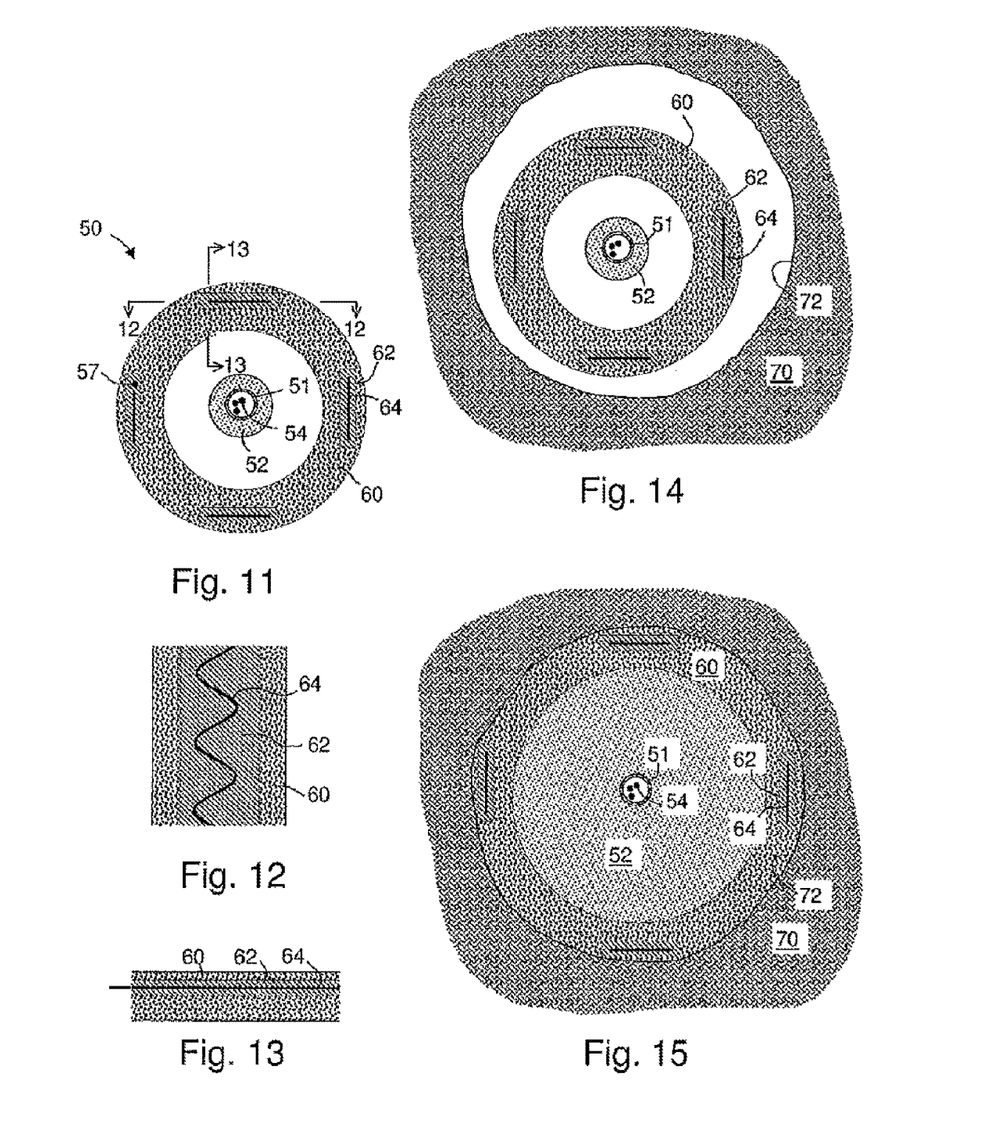
FIG. 11 is an axial cross-section of an optical sensing system in accordance with another embodiment.
FIG. 12 is a cross-section taken along the lines 12-12 of FIG. 11.
FIG. 13 is a cross-section taken along the lines 13-13 of FIG. 11.
FIG. 14 is a schematic axial cross-section of the system of FIG. 11 in a borehole.
FIG. 15 shows the system of FIG. 13 after swelling of two swellable layers.

Referring now to FIGS. 11 to 13, a multi-component cable 50 in accordance with a preferred embodiment comprises an inner tube 51, an expandable layer 52 surrounding tube 51, and an expandable tube 60 surrounding layer 52. Inner tube 51 is preferably substantially rigid and may comprise steel, polyamide, or the like. Inner tube 51 may be filled with a gel such as is known in the art or may be made solid using polyamide or the like. Layer 52 is preferably made of water- or oil-swellable elastomers, such as are known in the art. Tube 60 is preferably constructed from a deformable material such as an elastomer.

Elongate sensor pads or strips 62 preferably extend the entire length of the cable. The material of which tube 60 is made is preferable flexible and elastomeric so as to enable it to respond to the expansion of the underlying swellable layer 52. In preferred embodiments, the pads are made of Nylon 11, which is preferably also used for encapsulating the fiber optic and hydraulic control lines. Nylon 11 has a crush resistance in excess of 100 tons per square inch and excellent abrasion resistance. In some embodiments, sensor pads 62 define all or the majority of the outer surface of multi-component cable 50, so that tube 60 is not or not substantially exposed to the borehole wall. In these embodiments, multi-component cable 50 may have a more or less square cross-section. It will be understood that there are a variety of configurations in which sensor pads and/or additional protective layers might be applied to or near the outer surface of tube 60.

The purpose of tube 60 is to protect and hold the desired sensing fibers (described below) in position while running in-hole. The material preferably provides mechanical support but is flexible enough to be pushed like a balloon against the wall of the hole during installation (described below).

During installation of the cable, the annulus between 52 and 60 is preferable empty and sealed, or filled with a fluid that will not activate the expandable components.

One or more straight or substantially straight optical fibers 54 are housed in tube 51 and one or more sinusoidal fibers 64 are provided within expandable tube 60. In preferred embodiments, each sinusoidal fiber 64 is embedded in or mounted on an elongated sensor pad or strip 62 having a relative high Young's modulus, e.g. 500 to 5000 MPa. In some embodiments, an optional straight fiber 57 (shown in FIG. 11 only) is included with each sinusoidal fiber 64 in or on one or more of the sensor pads 62.

In some preferred embodiments, as illustrated, there are four sensor pads 62 evenly azimuthally spaced around tube 60. This embodiment provides two sets of fibers that are sensitive in two perpendicular plains. Having two sets of fibers for each orientation provides a useful redundancy in case, for example, sensor pads 62 twist when pressed against the uneven wall of an imperfectly shaped borehole. Optionally, the sinusoidal fiber 64 in one pad may have a different period, similar to a different "wrap angle," than that on the opposite pad. Thus, the multi-wrap-angle concepts discussed above could be used in conjunction with this cable design.

Sinusoidal fibers 64 and optional straight fibers 57 may be embedded in sensor pads 62 in an extrusion process. Sensor pads 62 may comprise any suitable extrusion materials such as are known in the art, including polyamide polymers, metal, or ceramic.

Turning now to FIGS. 14 and 15, multi-component cable 50 is shown in a borehole or data-hole 72 that has been drilled or otherwise provided in the subsurface 70. Multi-component cable 50 can be pushed or pulled into the data hole by any suitable means. As mentioned above, the annular space between inner tube 51 and the tube 60 is kept sealed during installation so as to prevent the swellable material 52 from activating.

Once the multi-component cable 50 is in place, swellable material(s) of layer 52 can be caused to swell by pumping an appropriate fluid (e.g. water) through the annulus between layer 52 and tube 60. As shown in FIG. 15, when swelling is complete, layer 52 and tube 60 will occupy the entire space between inner tube 51 and the hole wall. Inner tube 51 will be substantially centered in the hole and sinusoidal fibers 64 will be placed in proximity to the hole wall. In preferred embodiments, layer 52, tube 60 and sensor pads 62 are configured such that when swelling is complete, sensor pads 62 are pressed against the inside wall of the data-hole 72.

Multi-component cable 50 provides 3C operability with good acoustic coupling to the formation. Further, since it can be used in a small-diameter data-hole, multi-component cable 50 allows for relatively low-cost deployment and greatly reduced HSE footprint.

While FIGS. 14 and 15 describe multi-component cable 50 with respect to a data-hole, it will be understood that cable 50 is equally useful for surface applications. By way of example only, the embodiment shown in FIG. 16 comprises an optical sensing system 80 configured for use on the earth's surface. Like multi-component cable 50, optical sensing system 80 includes an inner tube 51 that houses one or more optical fibers 54. In addition, tube 51 may house one or more communication or power transmission lines 55. Alternatively, the optical fibers and the electrical wires may be in separate tubes (not shown). Surrounding tube 51 is an elongate body 82 having at least one flat bottom surface 83 and a top surface 84 that may be rounded. Also like multi-component cable 50, optical sensing system 80 includes at least one, and preferably a plurality of, sensor pads 62 that each include at least one sinusoidal fiber 64. Pads 62 are preferably arranged so that fibers 64 are sensitive to signals that are normal to the axis of the system 80. As in the embodiment illustrated in FIG. 16, one pad is preferably placed adjacent to bottom surface 83. In other preferred embodiments, at least one pad is substantially vertical.

Figure 16:
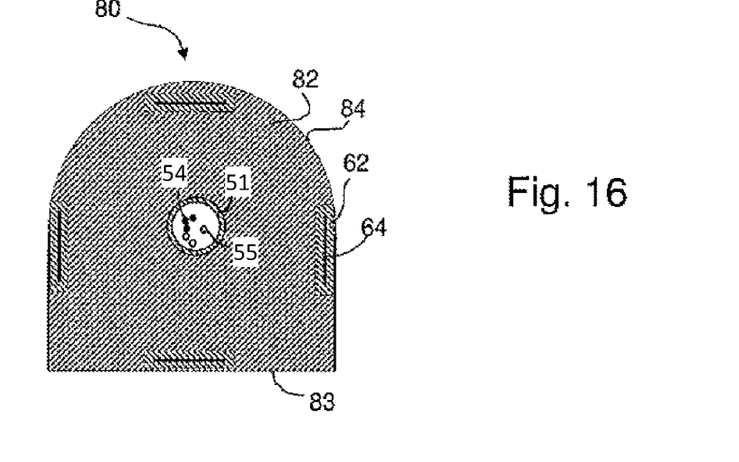
FIG. 16 is a schematic axial cross-section of an embodiment of the invention configured for use on the earth's surface.

Body 82 is preferably constructed from a material having a Young's modulus, similar to or higher than the Young's Modulus of the sensor pad 62 or materials similar to the encapsulation materials used for fiber optic and hydraulic downhole control lines, as are known in the art, so as to provide crush- and abrasion-resistance.

Figure 17:
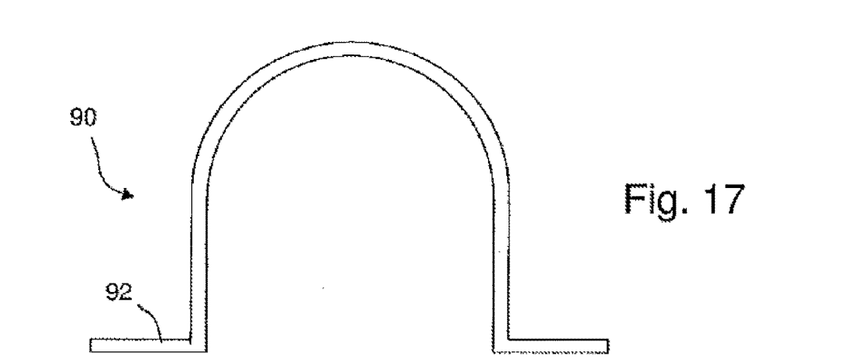
FIGS. 17 and 18 are alternative embodiments of a support device for use with the present invention.
Figure 18:
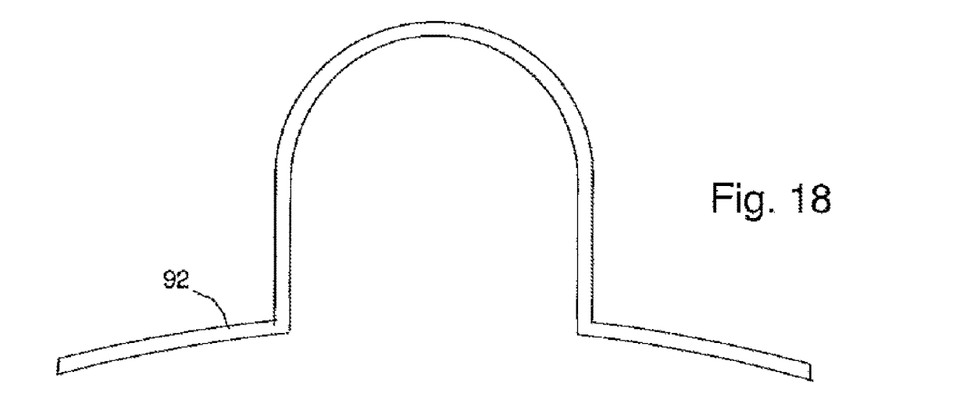

In preferred embodiments, system 80 is used on the earth's surface for monitoring seismic signals travelling through the subsurface. Thus, it may be used in conjunction with a ground anchor 90 such as is shown in FIG. 17. Anchor 90 preferably includes arms 92 through which suitable fasteners can be used to anchor the system. Similarly, if it is desired to affix system 80 to a curved surface, arms 92 can be curved as shown in FIG. 18. System 80 can be used for downhole or pipeline sensing in conjunction with an anchor and/or adhesive or other fastening means.

In addition to the various applications mentioned above, the optical sensing systems described herein can be used as towed streamer cables or deployed on the seabed (OBC). It is expected that DAS systems in underwater applications would work better than in trenched cables on land because of the absence of surface waves subsea and because the subsea acoustic media are stable over time and are not affected by seasonal changes.

The embodiments described herein can be used advantageously alone or in combination with each other and/or with other fiber optic concepts. The methods and apparatus described herein can be used to measure arrival times and waveforms of acoustic signals and in particular broadside acoustic waves. Arrival times and waveforms give information about the formation and can be used in various seismic techniques.

In still other applications, the methods and apparatus described herein can be used to detect microseisms and the data collected using the present invention, including broadside wave signals, can be used in microseismic localization. In these embodiments, the data are used to generate coordinates of a microseism. In still other applications, ability of the present systems to detect broadside waves and axial waves distinguishably can be used in various DAS applications, including but not limited to intruder detection, monitoring of traffic, pipelines, or other environments, and monitoring of various conditions in a borehole, including fluid inflow.

While preferred embodiments have been disclosed and described, it will be understood that various modifications can be made thereto without departing from the scope of the invention as set out in the claims that follow.

We claim:

1. A distributed fiber optic acoustic sensing system comprising:
    a towed streamer cable having a cable length, the towed streamer cable comprising:
        an elongated body having an outer surface;
        at least one straight optical fiber extending parallel to a longitudinal axis of the towed streamer cable along the cable length; and
        at least one helically wrapped optical fiber extending along the cable length and having a first predetermined wrap angle; and
    light transmitting and receiving means optically connected to said at least one straight optical fiber and the least one helically wrapped optical fiber for, respectively, transmitting optical signals into each of the at least one straight and at least one helically wrapped optical fibers and receiving a backscattered component of said signals out of the at least one straight and at least one helically wrapped optical fibers.

2. The distributed fiber acoustic sensing system according to claim 1, wherein the first predetermined wrap angle is measured with respect to a plane normal to the axis of the elongated body and wherein the first predetermined wrap angle is smaller than 90°.

3. The distributed fiber acoustic sensing system according to claim 1, wherein the system further comprises a first sheath layer on the outside of the elongated body and covering the elongated body and the first straight optical fiber.

4. The distributed fiber acoustic sensing system according to claim 3, wherein the towed streamer cable further comprises at least a second helically wrapped optical fiber wrapped around the outside of the first sheath layer.

5. The distributed fiber acoustic sensing system according to claim 4, wherein the first helically wrapped optical fiber and the second helically wrapped optical fiber define different wrap angles.

6. The distributed fiber acoustic sensing system according to claim 5, wherein the wrap angles are measured with respect to a plane normal to the axis of the elongated body and wherein the first predetermined wrap angle is 90° and the second predetermined wrap angle is less than 45°, or wherein the second predetermined wrap angle is 90° and the first predetermined wrap angle is less than 45°.

7. The distributed fiber acoustic sensing system according to claim 6, wherein the towed streamer cable further comprises a third helically wrapped optical fiber disposed on the outer surface at a wrap angle between 90° and 45°.

8. The distributed fiber acoustic sensing system according to claim 1, wherein the towed streamer cable is adapted to measure seismic signals along the towed streamer cable as a function of incidence angle of the seismic signals.

9. The distributed fiber acoustic sensing system according to claim 1, wherein the at least one straight optical fiber is arranged in the towed streamer cable.

10. The distributed fiber acoustic sensing system according to claim 1, further comprising:
    means for transmitting optical signals into each of the at least one straight and at least one helically wrapped optical fibers;
    means for receiving backscattered signals out of each of the at least one straight and at least one helically wrapped optical fibers consisting of a component of said optical signals which component has been backscattered from impurities or inhomogeneities in each of the at least one straight and at least one helically wrapped optical fibers;
    means for observing changes in the backscattered signals caused by axial stretching and compressing of each of the at least one straight and at least one helically wrapped optical fibers caused by an incident wave;
    means for comparing the backscattered signals of the at least one straight optical fiber and the at least one helically wrapped optical fiber; and
    means for determining, based on the comparing of the backscattered signals, a direction of wave propagation of the incident wave with respect to the longitudinal axis of the towed streamer cable for detecting broadside waves and axial waves distinguishably.

11. A distributed fiber optic acoustic sensing system comprising:
    a towed streamer cable having a cable length, the towed streamer cable comprising:
        an elongated body having an outer surface;
        at least one straight optical fiber extending parallel to a longitudinal axis of the towed streamer cable along the cable length; and
        at least two orthogonal sinusoidal optical fibers extending along the cable length; and
    light transmitting and receiving means optically connected to said at least one straight optical fiber and at least two orthogonal sinusoidal optical fibers for, respectively, transmitting optical signals into each of the at least one straight and at least at least two orthogonal sinusoidal optical fibers and receiving a backscattered component of said signals out of the at least one straight and at least at least two orthogonal sinusoidal optical fibers.

12. The distributed fiber acoustic sensing system according to claim 11, further comprising:
- means for transmitting optical signals into each of the at least one straight and at least at least two orthogonal sinusoidal optical fibers;
- means for receiving backscattered signals out of the each of the at least one straight and at least at least two orthogonal sinusoidal optical fibers consisting of a component of said optical signals which component has been backscattered from impurities or inhomogeneities in each of the at least one straight and at least at least two orthogonal sinusoidal optical fibers;
- means for observing changes in the backscattered signals caused by axial stretching and compressing of the each of the at least one straight and at least at least two orthogonal sinusoidal optical fibers caused by an incident wave;
- means for comparing the backscattered signals of the at least one straight optical fiber and the at least two orthogonal sinusoidal optical fibers; and
- means for determining, based on the comparing of the backscattered signals, a direction of wave propagation of the incident wave with respect to the longitudinal axis of the towed streamer cable for detecting broadside waves and axial waves distinguishably.

13. A distributed fiber optic acoustic sensing system comprising:
- a cable having a cable length comprising:
  - an elongated body having an outer surface;
  - at least one straight optical fiber extending parallel to a longitudinal axis of the cable along the cable length; and
  - at least one helically wrapped optical fiber extending along the cable length and having a first predetermined wrap angle; and
- light transmitting and receiving means optically connected to said at least one straight optical fiber and the least one helically wrapped optical fiber for, respectively, transmitting optical signals into each of the at least one straight and at least one helically wrapped optical fibers and receiving a backscattered component of said signals out of the at least one straight and at least one helically wrapped optical fibers;

wherein the cable is an ocean bottom cable (OCB) deployed on the seabed.

14. A distributed fiber optic acoustic sensing system comprising:
- a cable having a cable length, the cable comprising:
  - an elongated body having an outer surface;
  - at least one straight optical fiber extending parallel to a longitudinal axis of the cable along the cable length; and
  - at least two orthogonal sinusoidal optical fibers extending along the cable length; and
- light transmitting and receiving means optically connected to said at least one straight optical fiber and at least two orthogonal sinusoidal optical fibers for, respectively, transmitting optical signals into each of the at least one straight and at least at least two orthogonal sinusoidal optical fibers and receiving a backscattered component of said signals out of the at least one straight and at least at least two orthogonal sinusoidal optical fibers;

wherein the cable is an ocean bottom cable (OBC) deployed on the seabed.

15. A distributed fiber optic acoustic sensing system comprising:
- a cable having a cable length, the cable comprising:
  - an elongated body having an outer surface;
  - at least one straight optical fiber extending parallel to a longitudinal axis of the cable along the cable length; and
  - a first sinusoidal optical fiber extending in a first plane along the cable length;
  - a second sinusoidal optical fiber extending along the cable length, wherein the second sinusoidal optical fiber defines a plane perpendicular to the first plane; and
- light transmitting and receiving means optically connected to said at least one straight optical fiber and the first and second sinusoidal optical fibers for, respectively, transmitting optical signals into each of the at least one straight and first and second sinusoidal optical fibers and receiving a backscattered component of said signals out of the at least one straight and first and second sinusoidal optical fibers.

16. The distributed optic acoustic sensing system of claim 15, wherein the cable is a towed streamer cable.

17. The distributed optic acoustic sensing system of claim 15, wherein the cable is an ocean bottom cable (OCB) deployed on the seabed.

* * * * *